US009932256B2

(12) United States Patent
Rivera-Gerena et al.

(10) Patent No.: US 9,932,256 B2
(45) Date of Patent: Apr. 3, 2018

(54) TREATMENT FOR REUSE FOR DECENTRALIZED DOMESTIC SYSTEMS

(71) Applicants: Javier Rivera-Gerena, Cayey, PR (US); Fred James Fletcher-Purcell, San Juan, PR (US)

(72) Inventors: Javier Rivera-Gerena, Cayey, PR (US); Fred James Fletcher-Purcell, San Juan, PR (US)

( * ) Notice: Subject to any disclaimer, the term of this patent is extended or adjusted under 35 U.S.C. 154(b) by 209 days.

(21) Appl. No.: 14/957,642

(22) Filed: Dec. 3, 2015

(65) Prior Publication Data

US 2017/0158536 A1    Jun. 8, 2017

(51) Int. Cl.
| | |
|---|---|
| *B01D 63/00* | (2006.01) |
| *C02F 3/32* | (2006.01) |
| *C02F 9/00* | (2006.01) |
| *B01D 33/70* | (2006.01) |
| *C02F 1/32* | (2006.01) |
| *C02F 3/20* | (2006.01) |
| *C02F 1/00* | (2006.01) |
| *C02F 103/00* | (2006.01) |

(52) U.S. Cl.
CPC ............... *C02F 9/00* (2013.01); *C02F 1/008* (2013.01); *C02F 1/325* (2013.01); *C02F 3/20* (2013.01); *C02F 3/327* (2013.01); *C02F 2103/005* (2013.01); *C02F 2303/02* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 5,863,433 A * | 1/1999 | Behrends | ................ | C02F 3/00 210/150 |
| 5,947,041 A * | 9/1999 | Licht | ................ | B09C 1/002 111/200 |
| 6,250,237 B1* | 6/2001 | Licht | ................ | B09C 1/002 111/200 |
| 7,407,577 B2* | 8/2008 | Kerns | ................ | C02F 3/327 210/259 |
| 2003/0196375 A1* | 10/2003 | Ferro | ................ | A01C 11/04 47/58.1 SC |
| 2004/0101945 A1* | 5/2004 | Bogan | ................ | B09C 1/10 435/262.5 |
| 2012/0145628 A1* | 6/2012 | Ben Zvi | ................ | C02F 3/04 210/602 |
| 2015/0344338 A1* | 12/2015 | Granley | ................ | C02F 3/327 210/602 |
| 2017/0158536 A1* | 6/2017 | Rivera-Gerena | ........ | C02F 9/00 |

* cited by examiner

*Primary Examiner* — Ana Fortuna
(74) *Attorney, Agent, or Firm* — Eugenio J. Torres-Oyola; Victor Rodriguez-Reyes; Ferraiuoli LLC

(57) ABSTRACT

A wastewater treatment system for communities not connected to sewer infrastructure. The wastewater treatment system comprises a control unit electrically coupled to an ecologic cleaning system (i.e. phytoremediation), activated sludges and disinfection process (i.e. ultra violet light) in a re-circulation and continuous flow arrangement.

12 Claims, 4 Drawing Sheets

ENGDE Wastewater Treatment System Prototype

| Sample Number (Influent) | 2425823 | | | | | |
|---|---|---|---|---|---|---|
| Sample Number (Effluent) | 2425822 | | | | | |
| Sample Number (Effluent Duplicate) | 2432413 | | | | | |

Results

| Parameters | Units | Influent | Effluent | Variance | Effluent Duplicate | Variance |
|---|---|---|---|---|---|---|
| Chemical oxigen demand | mg/L | 213 | 31 | 182 | 31 | 182 |
| Non filterable residue | mg/L | 27.6 | BDL | * | BDL | |
| pH | SU | 7.27 | 7.91 | -0.64 | 7.91 | -0.64 |
| Biochemical oxygen demand | mg/L | 51 | 1 | 50 | 1 | 50 |
| Nitrite as N | mg/L | 0.16 | 0.77 | -0.61 | 0.77 | -0.61 |
| Nitrate as N | mg/L | 5.29 | 29.8 | -24.51 | 29.8 | -24.51 |
| Total Kjeldahl Nitrogen as N | mg/L | 142 | 0.28 | 141.72 | 0.28 | 141.72 |
| Alkalinity Total | mg/L as CaCO3 | 461 | 87.5 | 373.5 | 87.5 | 373.5 |
| Surfactants | mg/L as LAS mol wl 320 | 0.104 | 0.237 | -0.133 | 0.237 | -0.133 |
| Total Phosphorous | mg/L | 8.9 | 3.51 | 5.39 | 3.51 | 5.39 |
| Coliform - fecal | MPN/100 mL | 790000 | 1300 | 788700 | 1300 | 788700 |
| Coliform - Total | MPN/100 mL | 1300000 | 1300 | 1298700 | 1300 | 1298700 |
| Fecal Enterococcus | MPN/100 mL | 230000 | 4.5 | 229995.5 | 4.5 | 229995.5 |
| Ammonia | mg/L | 107 | 0.0901 | 106.9099 | 0.0901 | 106.9099 |

Fig. 3

| Sample | DO (ppm) | TDS (ppm) | Turbidity (NTU) | pH | Cond. (µS/cm) | NO3- (mg/L) | Time (hr) |
|---|---|---|---|---|---|---|---|
| Septic tank water info | 3.30 | 575 | 113 | 8.53 | 1169 | 1.3 | 0 |
| Phytoremedation treatment, aereted and UV light treatment | | | | | | | |
| Post-Treatment | 8.30 | 174.8 | 29 | 8.07 | 364 | 0.2 | 48 |
| Remotion % | | 69.6 | 74.33628 | 5.3927 | 68.862275 | 84.615 | |
| Incorporation % | 151.52 | | | | | | |

FIG. 4

TREATMENT FOR REUSE FOR DECENTRALIZED DOMESTIC SYSTEMS

CROSS-REFERENCE TO RELATED APPLICATION

N/A

STATEMENT REGARDING FEDERALLY SPONSORED RESEARCH AND DEVELOPMENT

N/A

BACKGROUND OF THE INVENTION

Field of the Invention

The present invention relates to the field of decentralized wastewater treatment for individual or clustered households sewage collection and/or septic tank for providing reusable water, more particularly to the post treatment of residential septic tanks wherein said treated water complies with the guidelines for water potable uses, such as irrigation and agricultural use.

Discussion of the Background

In recent years, the development of the rural areas with a rapid increase of living standards has resulted in an increase use of individual or clustered domestic sewage discharge volume, in such way that had become one of the economic factors limiting agricultural and rural environmental sustainability. Some areas are affecting potable water scarcity since it affects the potable water sources such as water wells.

Currently on site wastewater systems include a wide range of individual and cluster treatment systems that malfunction due to poor maintenance practices causing pollution to the environment and creating a risk to public health. The risks included contamination of aquifers and rivers, sources of potable water.

Several system are proposed to assist the process of treating the wastewater comprising biochemical processing system (anaerobic, anoxic, aerobic), ecological processing system and others. However, said system generate high nitrogen phosphorus load when not properly manage and/or are not prepared to regulated treated water PH in compliance with the government rules and laws, the quality of treated water from decentralized residential becomes unstable making the detoxification of water expensive and not reliable.

Therefore there is a need to provide a wastewater treatment, wherein said waste water including but not limit to gray water, black water and/or contaminated water for decentralized domestic systems in order to overcome the shortcomings of current wastewater treatment systems in such way that treated water is in compliance with non-potable water reuse limits

SUMMARY OF THE INVENTION

In light of the above shortcomings the present disclosure presents a wastewater treatment system comprising a control unit electrically coupled to an ecologic cleaning system (i.e. phytoremediation), activated sludges and disinfection process (i.e. ultra violet light) in a re-circulation and continuous flow arrangement.

Another object of the present invention is to provide a system that provides reusable water that complies with the government guidelines for water reuse.

Another objective of the present invention is to provide a system minimizing the footprint that is comparable with existing standard septic tanks structure surface area.

Another object of the present invention is to provide a system to control ventilation and odors from the wastewater treatment.

To enable a better understanding of the objectives and features of the present invention, a brief description of the drawing below will be followed with a detailed description of the invention.

BRIEF DESCRIPTION OF THE DRAWINGS

FIG. 3 is a first table presenting results of the using preferred embodiment for treatment in accordance with the principles of the present disclosure.

FIG. 4 is a second table presenting results of the using preferred embodiment for treatment in accordance with the principles of the present disclosure.

DETAILED DESCRIPTION OF THE INVENTION

Wastewater Treatment System Structure

The present invention discloses several preferred embodiments wherein each embodiment can be made of different materials, wherein the material selection depends on where the wastewater system is operated, employed or used. For example, the material used includes but is not limit to heat resistant plastic, aluminum alloy or stainless steel.

Figure 1:
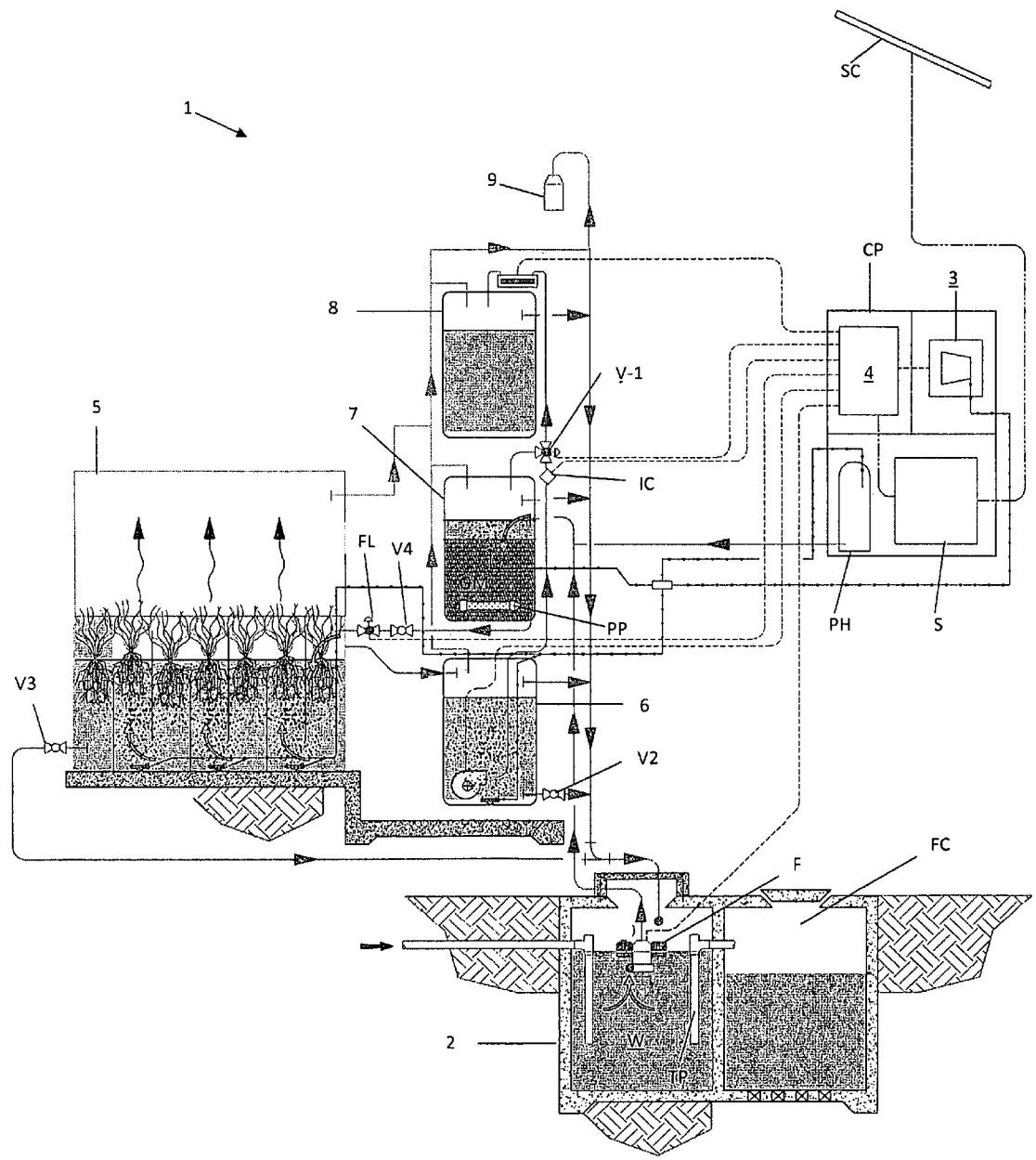
FIG. 1 is a plan view of the structure of the first preferred embodiment of the present disclosure.

The first preferred embodiment of the wastewater treatment system 1, as shown in FIG. 1, is described and constructed as follows:

At least a wastewater tank or septic tank 2
At least a recirculation tank 6
At least a greenhouse or phytoremediation system 5
At least a feed tank 7
At least an outflow tank 8
At least a control panel CP
At least a disinfection unit 9
At least an energy source SC The elements, when it is necessary, are electrically coupled by mean of cables and mechanically coupled by means of pipes, wherein the flow is regulated by valves which are explained below. Further the use of pumps is incorporated to redirect wastewater and treated water. First, as show in FIG. 1, a submersible pump P is installed inside the solids compartment of the septic tank 2. The submersible pump P is coupled to a floating device F to keep the suction submerged but in-taking wastewater W near the wastewater surface inside said septic tank 2. A wastewater level sensor L, wherein said level sensor L comprises a single sensor to identify wastewater W level inside the septic tank 2 or a first sensor measuring a high position and a second sensor measuring a lower position positioned inside the septic tank 2. The use of sensors defines the wastewater level inside the septic tank 2 in order to avoid damages to the submersible pump P due to solid elements in the wastewater W. Several variables or factors are consider for activating the submersible pump P, however one of the factors is the signal provided by the wastewater level sensor L which may shoot down the submersible pump or to activate the submersible pump P based on a particular value. For example, it is preferred to activate the submersible pump P when the wastewater W is below the transfer pipe TP to the filtration compartment FC of said septic tank 2. Further the wastewater W is pumped from the septic tank 2 towards the feed tank 7.

The feed tank 7 comprises a level sensor, gravel medium GM and a perforated collector pipe PP. At the feed tank 7 the wastewater W is aerated and passed through the gravel medium GM, wherein said perforated collector pipe PP is positioned at the lower part of feed tank 7 inside the gravel medium GM for water collection. The wastewater W is aerated by means of an aeration compressor unit 3 which provides air to the feed tank 7. Further using gravity, in order to avoid the use of pump, the wastewater treated at the feed tank 7 is transmitted from the perforated collector pipe PP to the phytoremediation system, more particularly to the phytoremediation tank PT. The wastewater W is forced by a series of baffles and aeration diffusers to maximize contact with the plants inside the phytoremediation tank PT. Similar to feed tank 7 the aeration diffusers are connected to the compressor unit 3. The plant type and quantity are defined after considering the amount of water to be reuse per day, waste water characteristics and others elements. The plant type is selected from a plant that could be both terrestrial and aquatics. Further the plant is capable of absorbing, concentrating and sequestrating contaminants from polluted wastewater in their roots. The phytoremediation tank PT is covered and sealed with a greenhouse structure to avoid odors to be released and rainwater to get into the phytoremediation system 5.

Gases from the treated water are collected by at least a ventilation pipe conventionally located at the greenhouse structure top cover, wherein said ventilation pipe redirected or released gases thru an air filter 9, such as an activated carbon air filter. The overflow of the treated wastewater at phytoremediation tank PT is redirected to the recirculation tank 6 preferably by mean of gravity. Wastewater is aerated inside the recirculation tank 6 using an aeration compressor unit 3 which also provides air to the feed tank 7 and the phytoremediation tank PT. The recirculation process, which includes transferring the treated wastewater from the recirculation tank 6 towards the feed tank 7 and then to the phytoremediation tank PT continues for a determined retention time. The retention time may vary depending on several factors. For example some of the factors include septic tank 2 dimensions, phytoremediation tank PT characteristics, water characteristics, such as clearness over 70%, and level of water at the outflow tank 8.

After the retention time, the automatic valve V1, which is a 3-way valve, changes its position in such way that provides a new path for the treated wastewater from the recirculation tank 6 to the feed tank 7 to the recirculation tank 6 toward outflow tank 8. Further system is provided with a light disinfection unit 9, wherein said light disinfection unit 9, such as a UV-Light disinfection unit, is located between the recirculation tank 6 and the outflow tank 8.

The control panel CP, includes an energy storage unit S, such as a battery and a control box 4, wherein said control box 4 comprises several inputs and outputs, mainly electrical inputs to received electric signals from several sensors, such as the level sensor L at the septic tank 2, and electrical outputs in order to provide an activation signals to the air compressor 3, a phytoremediation enhancer including but not limit to an acid control unit PH, pumps P and automatic valves V1, FL of the wastewater treatment system 1. The phytoremediation enhancer, more particularly the acid control unit PH controls the acidity and/or alkalinity of the treated water in order to optimize the plant production. In the instant case a pipe, connected between the acid control unit PH and the feed tank 7, transfers the substance to balance the acidity and/or alkalinity from the acid control unit PH to the feed tank 6 ones the control box 4 provides the activation signal to the acid control unit PH. The amount and type of substance is selected based on the wastewater acidity at the septic tank 2. The substance is preferably provided at the moment the wastewater W at the septic tank 2 is transferred to the feed tank 2. The wastewater and substance mix at the feed tank 7 is preferred to have a pH higher than 7, wherein pH is defined as numeric scale used to specify the acidity or alkalinity of an aqueous solution.

Further an in-line chemical analyzer IC may be located between the recirculation tank 6 and the feed tank 7. The in-line chemical analyzer IC provides at least a signal which is received by the control box 4, which may be use as one of the factors to open the 3-way valve V1. Therefore, as mentioned before, depending on control box 4 interpretation of the factors, such as the in-line chemical analyzer IC signal, said control box 4 activates the adequate action. Also drain valves V2, V3 are provided at the bottom of the feed tank 7 and the phytoremediation tank PT to redirect sediments and/or treated wastewater to the septic tank 2. One of the objects of the present disclosure is to provide a wastewater treatment system easy to dismount due to weather condition, such as hurricanes. The drain valves assists to provide a system that can be repair without by separate modules.

Further the treated water is reused in a draping irrigation system in a raised bed garden for ornamental plants or other approved reuse. Also a power source of renewable energy SC is electrically coupled to the energy storage unit S in order to provide a contamination free environment.

Figure 2:
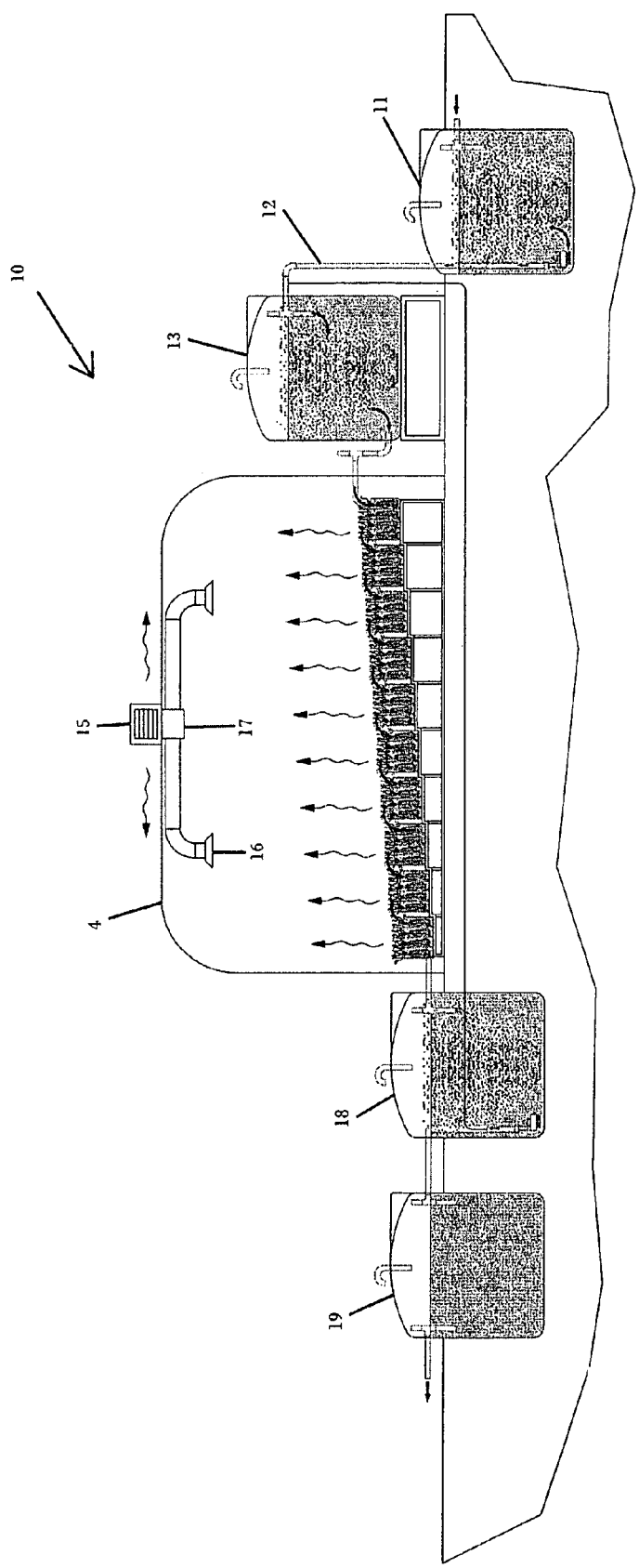
FIG. 2 is a plan view of the structure of the second preferred embodiment of the present disclosure.

FIG. 2 discloses a second embodiment comprising the following elements:
  At least a filtration tank 11
  At least a recirculation tank 18
  At least a greenhouse or phytoremediation system 14
  At least a feed tank 13
  At least an outflow tank 19
  At least an disinfection unit
  At least an air filtration unit The second embodiment 10 is almost similar to the first embodiment, wherein the difference between the second embodiment 10 and the first embodiment is the exchange from a septic tank 2 for a filtration tank 11; and the system dimension. The filtration tank 11 is a tank that receives waste water from several households or from several septic tanks.

As discussed above, the elements of the second embodiment 10, when it is necessary, are electrically coupled by mean of cables and mechanically coupled by means of pipes, wherein the flow is regulated by valves which are explained above. As show in FIG. 2 a submersible pump P2 is installed inside the solids compartment of the filtration tank 11. The submersible pump P2 is submerged inside filtration tank 11. A wastewater level sensor L2, wherein said level sensor L2 comprises a single sensor to identify wastewater W level inside the filtration tank 11 or a first sensor measuring a high position and a second sensor measuring a lower position positioned inside the filtration tank 11. The use of sensors defines the wastewater level inside the filtration tank 11 in order to avoid damages to the submersible pump P2 due to solid elements in the wastewater W.

Several variables or factors, analyzed by a control panel (not shown for FIG. 2), are consider for activating the submersible pump P2, however similar to the first embodiment, the signal provided by the wastewater level sensor L, after analyzed by the control panel, may shoot down the submersible pump P2 or to activate the submersible pump P2 based on a particular value. Further the wastewater W is pumped from the filtration tank 11 towards the feed tank 13.

The feed tank 13 is aerated by a diffuser positioned at the lower part of feed tank 13. The wastewater W is aerated by means of an aeration compressor unit which provides air to the feed tank 7. Further using gravity and at least a pipe the treated wastewater at the feed tank 13 is transmitted to the phytoremediation system 14, more particularly to the phytoremediation tank. The wastewater W is forced by a series of baffles and aeration diffusers to maximize contact with the plants inside the phytoremediation tank. The plant type and quantity, as mentioned before, are defined after considering the amount of water to be reuse per day, waste water characteristics and others elements. The plant type is selected from a plant that could be both terrestrial and aquatics. The phytoremediation tank 14 is covered and sealed with a greenhouse structure to avoid odors to be released and rainwater to get into the phytoremediation system 14. Gases from the treated water are collected by at least a ventilation pipe 16 conventionally located at the greenhouse structure top cover, wherein said ventilation pipe redirected or released gases thru an air filter 17 and a fan 15. The treated wastewater at phytoremediation tank PT is redirected to the recirculation tank 18 preferably by mean of gravity. Wastewater is aerated inside the recirculation tank 18 using an aeration compressor unit which also provides air to the feed tank 13 and the filtration tank 11. Further a UV-light is provided as a disinfection unit between the recirculation tank 18 and outflow tank 19.

Wastewater Treatment System Process

Process Sequence:

1) A signal generated from the control panel activates a first pump P, P2 at a Wastewater tank 2,11.
2) Wastewater W is pumped to the Feed Tank.
3) Wastewater characteristics are altered for phytoremediation optimization.
4) Wastewater is treated at the Feed Tank. For example wastewater is aerated and passed through a gravel medium.
5) Treated wastewater is transferred to the phytoremediation tank by mean of gravity.
6) Wastewater is treated at the phytoremediation tank. For example, the water is forced by a series of baffles and aeration diffusers to maximize contact with the plants, such as hyacinth roots inside the phytoremediation tank.
7) Gases are collected. The phytoremediation tank is covered and sealed with a greenhouse structure to avoid odors to be released and rainwater to get into the system. Gases are collected by a ventilation pipe and released thru an activated carbon filter.
8) The treated wastewater at the phytoremediation tank is transferred to the Recirculation Tank by mean of a pipe and gravity.
9) Wastewater is treated at the Recirculation Tank. For example the wastewater is aerated inside the Recirculation Tank
10) Treated wastewater is recirculated repeating steps 4 through 9 for a determined retention time.
11) A signal is generated from the control panel in order to activate an automatic 3-WAY valve. After the retention time is completed, the automatic 3-WAY change position to allow the treated water to be pumped to the Outflow Tank.
12) Treated wastewater is transferred to the outflow tank.
13) Treated wastewater is disinfected. For example, Treated wastewater is passes thru a UV-Light disinfection unit.
14) Treated wastewater is stored in the Outflow Tank.
15) Treated Water is reused in a dripping irrigation system in a raised bed garden for ornamental plants or other approved reuse.

The process is repeated as necessary. Further, with the exception of the septic tank, the wastewater system can be disassembled for easy cleaning or removed in case of weather threats, such as hurricanes.

FIG. 3 and FIG. 4 are directed to showing result of the preferred embodiment in accordance with the principles of the present disclosure. As shown, the water from septic tanks is treated with the preferred embodiment as shown in FIG. 1. Several measures are provided before the water is treated with the disclosed wastewater treatment system 1. The results (i.e. FIG. 3 and FIG. 4) of the treated water after 48 hour shows water that complies with the guidelines for water potable uses, such as irrigation and agricultural use.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

We claim:

1. A wastewater treatment system comprising:
at least a wastewater tank comprising a first fluid;
at least a recirculation tank;
at least a phytoremediation system;
at least a feed tank,
at least an outflow tank;
at least a control panel;
at least a disinfection unit;
at least an energy source;
a first fluid transferring device, wherein said first transferring device directs the first fluid from the wastewater tank towards the feed tank for treating said first fluid;
wherein said first fluid is treated at said feed tank generating a second fluid;
a second fluid transferring device, wherein said second fluid transferring device directs the second fluid from the feed tank towards the phytoremediation system;
wherein said second fluid is treated at said phytoremediation system generating a third fluid;

a third fluid transferring device, wherein said third fluid transferring device directs the third fluid from the phytoremediation system towards the recirculation tank;

wherein said third fluid is treated at said recirculation tank generating a fourth fluid;

a fourth fluid transferring device, wherein said fourth fluid transferring device directs the fourth fluid from the recirculation tank towards the outflow tank; and wherein said fourth fluid is exposed to the disinfection unit before reaching the outflow tank.

2. The wastewater treatment system as in claim 1, wherein the first fluid transferring device comprises a first pump and at least a first pipe.

3. The wastewater treatment system as in claim 1, wherein the second fluid transferring device comprises a first valve and at least a second pipe.

4. The wastewater treatment system as in claim 1, wherein the third fluid transferring device comprises at least a third pipe.

5. The wastewater treatment system as in claim 1, wherein the fourth fluid transferring device comprises a second pump, a recirculation valve and at least a fourth pipe.

6. The wastewater treatment system as in claim 5, wherein said recirculation valve controls a first flow of the fourth fluid toward the outflow tank.

7. The wastewater treatment system as in claim 5, wherein said recirculation valve controls a first flow of the fourth fluid toward the feed tank.

8. The wastewater treatment system as in claim 1, wherein the feed tank comprises a aeration unit.

9. The wastewater treatment system as in claim 1, wherein the feed tank comprises a gravel medium.

10. The wastewater treatment system as in claim 1, wherein the disinfection unit comprises a ultra violet light unit.

11. The wastewater treatment system as in claim 1, further comprises a phytoremediation enhancer, wherein said phytoremediation enhancer is controlled by said control unit; and wherein said phytoremediation enhancer is couple to the feed tank.

12. The wastewater treatment system as in claim 11, wherein said phytoremediation enhancer comprises a acid control unit.

* * * * *